(12) United States Patent
Xu

(10) Patent No.: US 6,643,914 B1
(45) Date of Patent: Nov. 11, 2003

(54) METHOD FOR ASSEMBLING A DISK DRIVE

(75) Inventor: Yanchu Xu, San Jose, CA (US)

(73) Assignee: Maxtor Corporation, Longmont, CO (US)

( * ) Notice: Subject to any disclaimer, the term of this patent is extended or adjusted under 35 U.S.C. 154(b) by 267 days.

(21) Appl. No.: 09/765,294

(22) Filed: Jan. 18, 2001

Related U.S. Application Data
(60) Provisional application No. 60/210,854, filed on Jun. 9, 2000.

(51) Int. Cl.⁷ .......................... G11B 5/127; H04R 31/00
(52) U.S. Cl. ................. 29/603.03; 29/603.09; 29/593; 360/97.02; 360/97.03
(58) Field of Search .................. 29/603.03, 603.09, 29/593; 360/97.02, 97.03

(56) References Cited

U.S. PATENT DOCUMENTS

| | | | | |
|---|---|---|---|---|
| 4,396,475 A | * | 8/1983 | Stehlik ........................ 205/748 |
| 5,041,934 A | * | 8/1991 | Stefansky ................. 360/264.7 |
| 5,282,100 A | * | 1/1994 | Tacklind et al. .......... 360/97.02 |
| 5,307,222 A | * | 4/1994 | Dion ....................... 360/97.02 |
| 5,417,743 A | * | 5/1995 | Dauber ........................... 96/13 |
| 5,447,695 A | * | 9/1995 | Brown et al. ................ 422/171 |
| 5,455,728 A | * | 10/1995 | Edwards et al. .......... 360/256.2 |
| 5,515,214 A | * | 5/1996 | Kiyonaga et al. ......... 360/97.02 |
| 5,602,700 A | * | 2/1997 | Viskochil et al. ......... 360/256.1 |
| 5,754,365 A | * | 5/1998 | Beck et al. ............... 360/97.02 |
| 6,108,162 A | * | 8/2000 | Amirkiai et al. .......... 360/97.01 |
| 6,128,159 A | * | 10/2000 | Ino .......................... 360/97.02 |
| 6,212,759 B1 | * | 4/2001 | Liu et al. ................. 29/603.03 |
| 6,238,467 B1 | * | 5/2001 | Azarian et al. ............... 96/135 |
| 6,266,208 B1 | * | 7/2001 | Voights .................... 360/97.02 |
| 6,296,691 B1 | * | 10/2001 | Gidumal ......................... 96/17 |
| 6,395,073 B1 | * | 5/2002 | Dauber ......................... 96/134 |

\* cited by examiner

*Primary Examiner*—A. Dexter Tugbang
*Assistant Examiner*—Paul D Kim
(74) *Attorney, Agent, or Firm*—Marsh Fischmann & Breyfogle LLP

(57) ABSTRACT

A method for assembling a disk drive using a multifunctional push-pin hole is disclosed. A push-pin of a servo writer is directed through the push-pin hole of the disk drive for executing a servo writing operation. The push-pin is withdrawn from the push-pin hole at the completion of the servo writing operation. A filter is disposed within the push-pin hole so as to be disposed within an interior of the disk drive. This filter may provide one or more of a humidity control/adjustment function and a chemical filtering function (e.g., an integrated chemical filter). Moreover, this filter may work as a sound barrier. That is, this filter may be used to reduce sound intensity outside the disk drive on top of the push-pin hole in relation to those prior art push-pin holes which were sealed by only a piece of tape on an exterior surface of the disk drive.

31 Claims, 5 Drawing Sheets

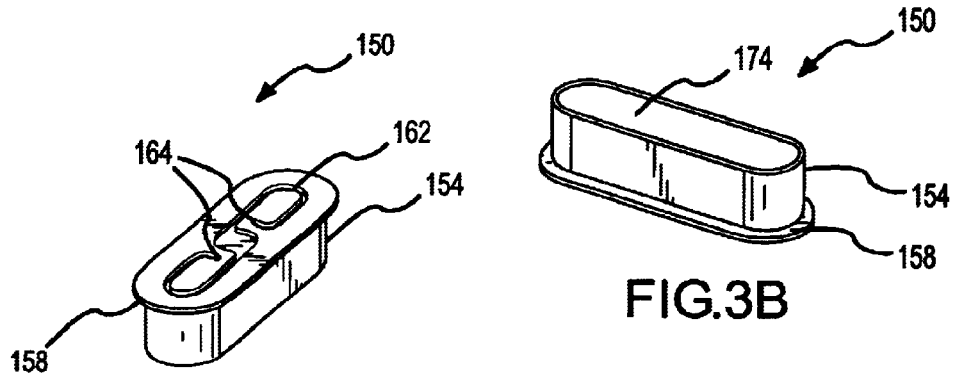
FIG.3A
FIG.3B
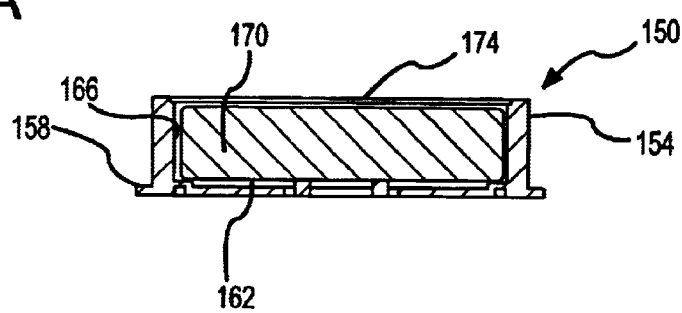
FIG.3C
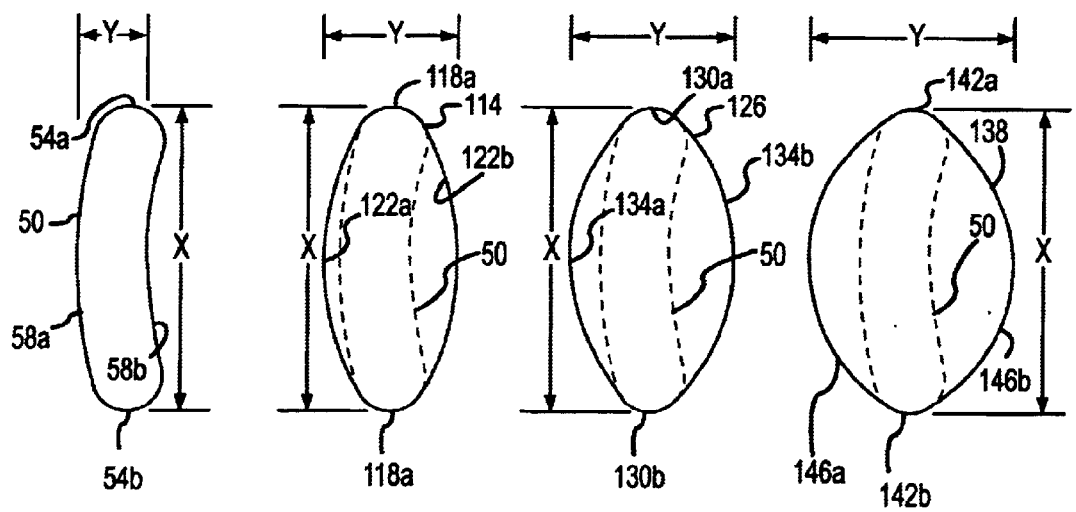
FIG.5A (PRIOR ART)  FIG.5B  FIG.5C  FIG.5D

METHOD FOR ASSEMBLING A DISK DRIVE

CROSS-REFERENCEE TO RELATED APPLICATIONS

This application claims priority from U.S. Provisional Patent Application Serial No. 60/210,854, which is entitled "Combined Filter and Push-Pin Hole for Acoustic Reduction," which was filed on Jun. 9, 2000, and the entire disclosure of which is incorporated by reference in its entirety herein.

FIELD OF THE INVENTION

The present invention generally relates to disk drives and, more particularly, to a disk drive which includes a multi-functional push-pin hole in that this hole may be used for servo writing on a data storage disk(s) disposed within a disk drive and also may be used for mounting a disk drive filter, such as an integrated chemical filter.

BACKGROUND OF THE INVENTION

Disk drives typically include a base plate and a cover which is detachably connected with this base plate to define an at least substantially enclosed space for housing various disk drive components. One or more data storage disks are mounted on a spindle which is interconnected with the base plate and/or cover so as to allow the data storage disk(s) to rotate relative to both the base plate and cover via a spindle motor. An- actuator arm assembly (e.g., a single actuator arm, a plurality of actuator arms, an E block with a plurality of actuator arm tips), is interconnected with the base plate and/or cover by an appropriate bearing or bearing assembly so as to allow the actuator arm assembly to pivot relative to both the base plate and cover in a controlled manner. A suspension or load beam may be provided for each data storage surface of each data storage disk (typically each disk has two of such surfaces). All suspensions are appropriately attached to and extend away from the actuator arm assembly in the direction of the data storage disk(s). A transducer, such as a read/write head, is disposed on the free end of each suspension for purposes of exchanging signals with the corresponding data storage disk. The position of the actuator arm assembly and thereby each transducer is controlled by a voice coil motor or the like which pivots the actuator arm assembly to dispose the transducer(s) at the desired radial position relative to its corresponding data storage disk.

Each data storage disk has a plurality of concentrically disposed tracks that are available for data storage. These tracks are formed on the data storage disk(s) after they have been enclosed in the space between the cover and base plate. One way in which this has been done in the past is by including a push-pin hole on the base plate of the disk drive. Formation of the tracks on the data storage disk(s) of the disk drive entails directing a push-pin through this push-pin hole in the disk drive base plate and into engagement with the actuator arm assembly. This push-pin is part of a servo writer which moves the push-pin in a controlled manner to a position where the actuator arm assembly is disposed in a certain position for writing a track on the disk(s) at a specific radial location on the disk(s) via the relevant read/write head. After each of the tracks have been created in this general manner, the push-pin is withdrawn from the push-pin hole. A piece of tape is then typically applied over (not within) the push-pin hole on the exterior surface of the base plate so as to mechanically seal the push-pin hole.

Various types of filters have been utilized and/or proposed for disk drives. Known disk drive filters address one or more of particulates, chemical vapors, and moisture/humidity. None of these filters have been installed in any known disk drive using the above-noted push-pin hole.

BRIEF SUMMARY OF THE INVENTION

The present invention is embodied in a disk drive that includes a disk drive base plate with a push-pin hole. A filter is preferably removably disposed in this push-pin hole. That is, the filter may be positioned in the push-pin hole at one time (e.g., during normal disk drive operations), and may be removed from the push-pin hole at another time (e.g., during at least a portion of the assembly of the disk drive, such as for servo writing operations).

Various refinements exist of the features noted in relation to the present invention. Further features may also be incorporated in the present invention as well. These refinements and additional features may exist individually or in any combination. The disk drive may include various other components, such as at least one data storage disk, a motor or the like for rotating each data storage disk (e.g., a spindle motor), an actuator arm assembly (e.g., a single actuator arm, a plurality of actuator arms, an E block with a plurality of actuator arm tips), a motor for moving the actuator arm assembly relative to the data storage disk(s) (e.g., a voice coil), at least one suspension which extends from the actuator arm assembly, and a transducer for each suspension which exchanges signals with its corresponding data storage disk for read/write to operations.

Each data storage disk utilized by the disk drive is disposed in spaced relation to the disk drive base plate. Multiple data storage disks would typically be disposed in a stack in vertical alignment with each other. Therefore, the perimeter of each data storage disk would also be similarly vertically aligned. The projection of this typically circular perimeter onto the disk drive base plate (e.g., a perpendicular extension from the data storage surface of the "lowermost" disk) may be characterized as defining a first region on the base plate. In one embodiment the entirety of the push-pin hole is disposed in this first region. Another way of characterizing the relative position of the push-pin hole, and thereby the filter as well, is that the push-pin hole and filter may be disposed "directly under" the data storage disk or the data storage disk stack in the case of a multiple data storage disk arrangement. In one embodiment, this filter is an integrated chemical filter that provides a chemical filtering function and a moisture/humidity control/reduction function as well.

The push-pin hole may assume a variety of configurations. In one embodiment, the push-pin hole is at least generally elliptical. The push-pin hole may also be characterized as including a pair of spaced apart ends which correspond with a length dimension of the push-pin hole, and as further including a pair of spaced apart sides which interconnect these ends and which correspond with a width dimension of the push-pin hole. In one embodiment, the magnitude of the width dimension of the push-pin hole increases when proceeding from each of the noted ends toward a midpoint between these spaced ends. In another embodiment, the noted sides of the push-pin hole are disposed in non-parallel relation. In yet another embodiment, the noted sides of the push-pin hole are disposed in parallel relation. Preferably, the maximum noted width dimension of the push-pin hole is less than the maximum noted length dimension of the push-pin so as to not significantly adversely affect the mechanical stiffness of the disk drive base plate.

The filter associated with the present invention provides a filtering function by allowing for the passage of a fluid flow therethrough in some manner. One way of characterizing this filter is that the filter purposefully allows for the flow of a fluid through an appropriate filtering material. In one embodiment, the filter provides this function by utilizing a filtering material or medium which allows for an airflow of at least about 10–15 cc/minute. Typically the filter will include a housing having at least one fluid inlet and at least one fluid outlet with an appropriate filtering material being disposed therebetween.

The filter associated with the present invention may be an integrated chemical filter. These types of filters generally filter gaseous constituents and also may reduce/control the moisture content of air passing through the filter (e.g., the humidity of the airflow). The filter will then typically include an appropriate filtering material, such as charcoal. In one embodiment, a minimum amount of this filtering material is about 200 milligrams, and in another embodiment this minimum amount is about 400 milligrams. Another way of characterizing the size of the filter is the volume of a space within a filter housing which is available for storing an appropriate filtering material and which will typically vary based upon the volume of the enclosed space within the disk drive. The filter associated with the present invention may also provide an acoustic reduction function. In one embodiment, the sound intensity on the top of the push-pin hole is about 45 decibels with the filter being disposed within the push-pin hole and during normal disk drive operations (e.g., with the data storage disk(s) being rotated at a velocity of at least about 5,400 RPM), in comparison to about 52 decibels in the same operation condition, but using a conventional single function prior art push-pin hole with a piece of tape disposed over this push-pin hole.

BRIEF DESCRIPTION OF THE SEVERAL VIEWS OF THE DRAWING

FIG. 3A is a perspective view of one embodiment of an integrated chemical filter ("ICF") that may be installed in a push-pin hole of a disk drive when the same is not being used for servo writing operations.

FIG. 3B is another perspective view of the ICF of FIG. 3A.

FIG. 3C is a cross-sectional view of the ICF of FIG. 3A.

FIG. 5A is a top view of the type of prior art push-pin hole utilized in the disk drive base plate of FIGS. 1A–B.

FIGS. 5B–D are alternate configurations for a multifunctional push-pin hole which may be utilized by the disk drive base plates of FIGS. 2 and 4A–C.

DETAILED DESCRIPTION OF THE INVENTION

Figure 1A:
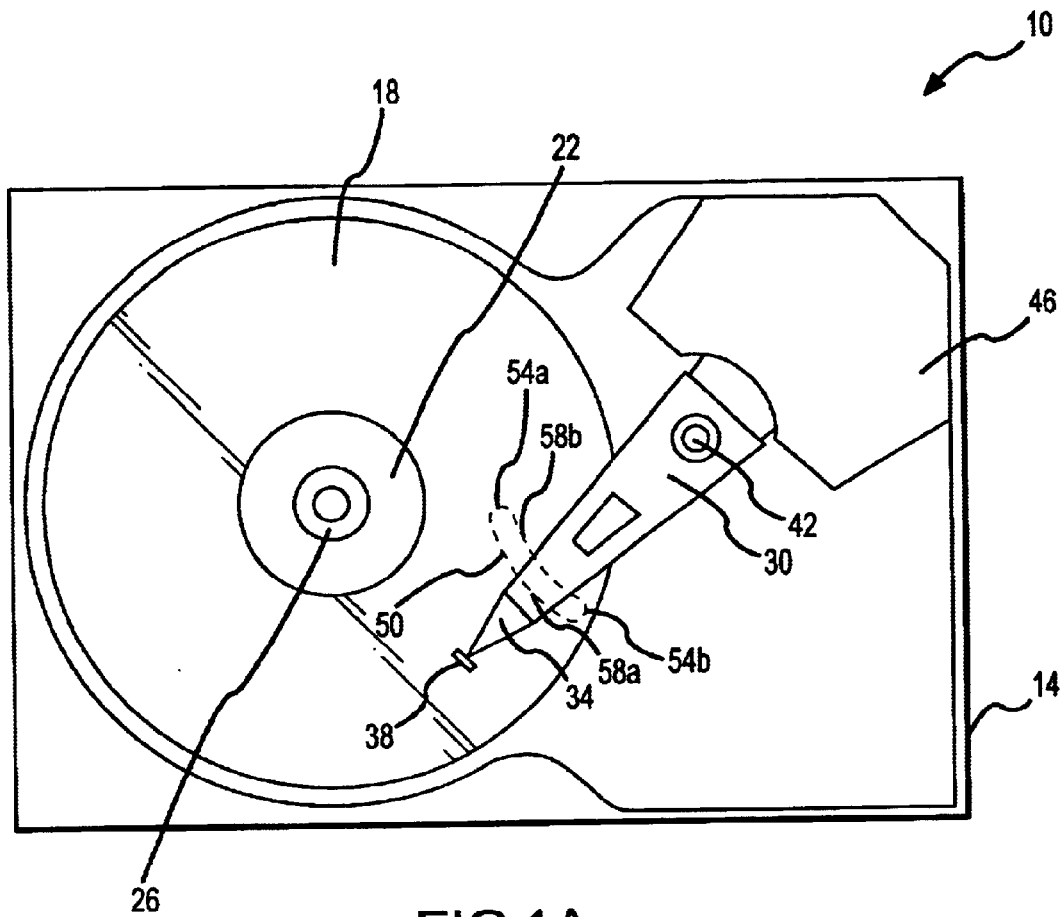
FIG. 1A is a top view of one embodiment of a prior art disk drive having a push-pin hole through its base plate for servo writing operations.

The present invention will now be described in relation to the accompanying drawings which at least assist in illustrating its various pertinent features. A prior art disk drive 10 is illustrated in FIG. 1A and includes a base plate 14 and at least one data storage disk 18. Only one data storage disk 18 is illustrated in FIG. 1A. Multiple data storage disks 18 would be disposed within a stack in vertically spaced and vertically aligned relation. Each data storage disk 18 is appropriately mounted on a spindle 22, which in turn is rotatably interconnected with the base plate 14. Rotation of the spindle 22 and the data storage disk(s) 18 is provided by a spindle motor 26.

The disk drive 10 further includes an actuator arm assembly 30 (e.g., a single actuator arm, a plurality of actuator arms, an E block with a plurality of actuator arm tips) that is interconnected with the base plate 14 by an actuator arm pivot 42. A suspension 34 extends from the actuator arm assembly 30 for each data storage surface of the data storage disk(s) 18 which is being utilized by the disk drive 10, and includes a transducer or a read/write head 38 that exchanges signals with the data storage surface of its corresponding data storage disk 18. Information is stored on the data storage disk 18 in a plurality of concentrically formed tracks (not shown) that are formed on one or both of the data storage surfaces of the data storage disk 18. The read/write head 38 is moved to the desired track on the data storage disk 18 by movement of the actuator arm assembly 30 about its actuator arm pivot 42. Movement of the actuator arm assembly 30 in this controlled manner is provided by a voice coil 46 or the like.

The base plate 14 utilized by the disk drive 10 of FIG. 1A includes a push-pin hole 50 that extends entirely through the disk drive base plate 14. This push-pin hole 50 includes a pair of ends 54 that are spaced apart and interconnected by a pair of sides 58 which are also spaced apart. After the disk drive 10 has been completely assembled, including after an appropriate cover (not shown) has been disposed over the base plate 14 to dispose the data storage disk(s) 18 in an at least substantially enclosed space, the above-noted tracks are formed on the data storage disk by a servo writer. A push-pin of the server writer is directed through the push-pin hole 50 from the back side of the base plate 14 to move or follow the movement of the actuator arm assembly 30 to the desired radial position on the data storage disk 18, at which time the track is formed through a signal exchange between the read/write head 38 and the data storage disk 18. After each of the tracks have been formed in this manner, the push-pin is withdrawn from the push-pin hole 50. Typically the push-pin hole 50 will then be sealed by disposing an appropriate tape or the like over the push-pin hole 50 on the back surface of the base plate 14 (i.e., that surface which is opposite that illustrated in FIG. 1A). In one embodiment, the sound intensity outside of the disk drive 10 and on top of the push-pin hole 50, with a single data storage disk 18 being rotated at a velocity of about 5,400 RPM, was about 50 decibels.

Figure 1B:
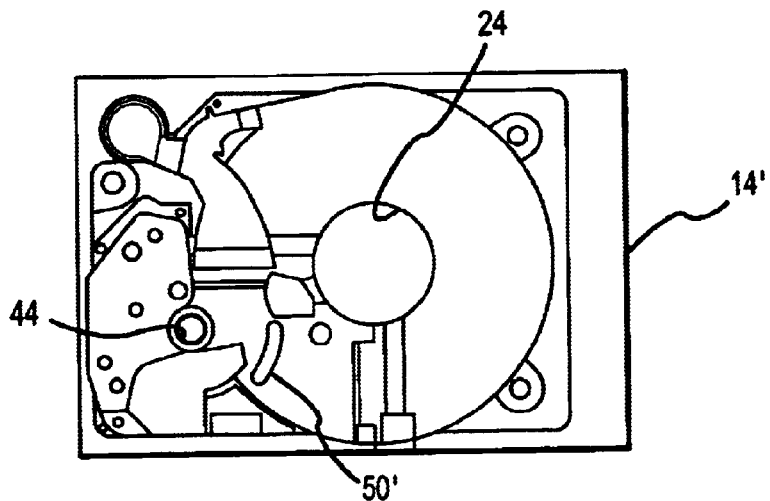
FIG. 1B is a top view of a prior art modified base plate which may be utilized by the disk drive of FIG. 1A.

Another embodiment of a prior art base plate that may be utilized by the disk drive 10 of FIG. 1A is illustrated in FIG. 1B in the form of a base plate 14'. The "single prime" designation is used to identify that there are differences between the base plate 14 of FIG. 1A and the base plate 14' of FIG. 1B. The only substantial difference between the embodiments of FIG. 1A and 1B is a change in relative position between a number of the above-noted components.

In this regard, FIG. 1B includes the push-pin hole 50' and its actuator arm pivot 42 (not shown, but which is disposed in an actuator arm pivot aperture 44) are on the same side of the rotational axis of the data storage disk 18 (not shown) which is defined by the spindle 22 (not shown, but which is disposed in a spindle aperture 24), versus on opposite sides as illustrated in the embodiment of FIG. 1A.

Figure 2:
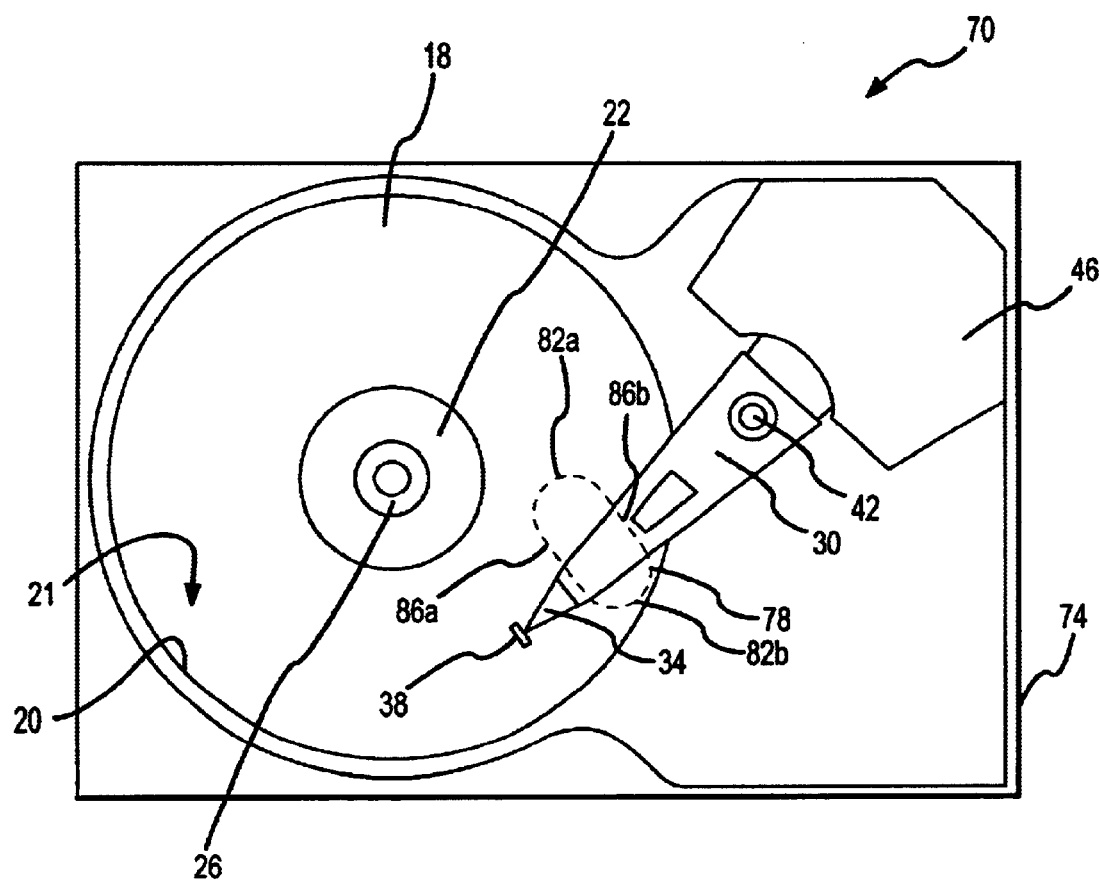
FIG. 2 is a top view of one embodiment of a disk drive having a multifunctional push-pin hole through its base plate.

Another embodiment of a disk drive 70 in accordance with one or more principles of the present invention is illustrated in FIG. 2 which includes a new push-pin hole 78. Components of the disk drive 70 which are the same as those utilized by the disk drive 10 of FIG. 1A are similarly identified in FIG. 2. The primary distinction between the disk drive 70 of FIG. 2 and disk drive 10 of FIG. 1A is in relation to the aperture used for servo writing operations. In this regard, the disk drive 70 includes a base plate 74 having a push-pin hole 78. The push-pin hole 78 includes a pair of ends 82 that are spaced apart and interconnected by a pair of sides 86 which are also spaced apart.

A different configuration is utilized for the push-pin hole 78 of FIG. 2 in comparison to the prior art push-pin hole 50 of FIG. 1A. In this regard, the sides 86 of the push-pin hole 78 are linear and disposed in parallel relation, whereas the sides 58 of the prior art push-pin hole 50 are accurate and disposed in parallel relation. The push-pin hole 78 of FIG. 2 is also larger than the prior art push-pin hole 50 of FIG. 1A. In one embodiment, the area occupied by the push-pin hole 78 (in a plan view) is about 180 mm$^2$, compared to about 120 mm$^2$ for the prior art push-pin hole 50. In one embodiment, the area of the push-pin hole 78 (as well as for any of the other multi-functional push-pin holes to be addressed herein) as characterized above may be at least about 160 mm$^2$. The sides 86 of the push-pin hole 78 are also spaced further apart than the sides 58 of the prior art push-pin hole 50. In one embodiment, the sides 86 of the push-pin hole 78 are separated by a distance of about 9 mm, while the sides 58 of the prior art push-pin hole 50 are separated by a distance of about 4 mm (both measured along the "Y" dimension addressed below in relation to FIGS. 5A–D). In one embodiment, the sides 86 of the push-pin hole 78 are separated in this manner by a distance of at least about 6 mm at least at one location of the push-pin hole 78.

Another difference between the push-pin hole 50 of FIG. 1 and the push-pin hole 78 of FIG. 2 is that the push-pin hole 78 of FIG. 2 is used not only but for servo writhin operations is also used for filtering. Therefore, the push-pin hole 78 may be properly characterized as a multifunctional push-pin hole 78. One embodiment of an integrated chemical filter ("ICF") 150 which may be disposed in (versus over) this multifunctional push-pin hole 78 is illustrated in FIGS. 3A–C. Generally, the ICF 150 includes a housing 154 which is of at least substantially the same size and configuration as the multifunctional push-pin hole 78. A flange 158 is disposed on one end of the housing 154 to appropriately seat the ICF 150 within the multi-functional push-pin hole 78 by engaging the back surface of the base plate 74. An appropriate filtering material 170 (e.g., charcoal) is disposed within a hollow interior 166 of the ICF 150. Air may be exchanged between the interior and exterior of the disk drive 70 by passing through both a membrane 174 disposed on one end of the housing 154 of the ICF 150 and through a flow channel 162 that is formed on the opposite end of the housing 154 of the ICF 150 and that has a pair of inlets 164.

One function of the ICF 150 is to filter gaseous chemicals. Another function of the ICF 150 is to control/adjust/filter humidity or moisture content of air passing through the ICF 150. In order to provide both of these functions, a sufficient amount of the filtering material 170 is required. In one embodiment, the minimum amount of filtering material 170 for the ICF 150 is about 200 milligrams, and in another embodiment is about 400 milligrams. Stated another way, the minimum volume of the interior 166 of the housing 154 of the ICF 150 (which defines the space available for the filtering material 170) is at least about 250 mm$^3$. Yet another function provided by the ICF 150 is for acoustic reduction purposes. In one embodiment, when the ICF 150 is disposed in the push-pin hole 78 of the disk drive 70 with a single data storage disk 18 being rotated at a speed of about 5,400 RPM, the sound intensity outside the disk drive 70 and on top of the push-pin hole 78 was reduced by about 6 decibels in comparison to the embodiment of FIG. 1A (where the single function push-pin hole 50 was utilized and where a simple piece of tape was disposed over the push-pin hole 50 after servo writing operations were completed). Another way of quantifying the "sound barrier" quality of the ICF 150 is that the overall sound power level of the disk drive 70 is reduced by at least about 1.5 decibels with the ICF 150 disposed in the push-pin hole 78 in comparison to using a single function prior art push-pin hole 50 with a piece of tape disposed thereover.

Integrated chemical filters which are functionally similar to the ICF 150 have been utilized in prior art disk drives. However, there are number of important distinctions. The prior art integrated chemical filters were not installed in a push-pin hole as in the case of the ICF 150. Moreover, the ICF 150 is installed at a different position in the disk drive 74 than has been utilized in prior art disk drive designs. Generally, the ICF 150 is disposed closer to the data storage disk 18 than in the case of prior art disk drives that have included an integrated chemical filter. In this regard, the ICF 150 may be characterized as being disposed in vertical alignment with or "directly under" the data storage disk 18. Consider that a projection of a perimeter of the data storage disk 18 down onto the base plate 74 (parallel with the spindle 22) defines a region 21 on the base plate 74 having a perimeter 20. The push-pin hole 78 is disposed entirely within this region 21. The multifunctional push-pin hole 78 is disposed entirely within this region 21. In contrast, not only were known prior art integrated chemical filters installed in the cover versus the base plate of the disk drive, but these prior art integrated chemical filters were disposed "radially beyond" the data storage disk(s) (i.e., not in vertical alignment with or "directly under" the data storage disk or disk stack).

Figure 4A:
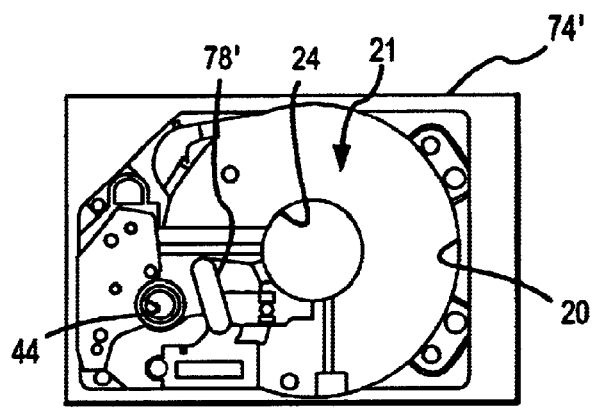
FIG. 4A is a top view of a one embodiment of a modified disk drive base plate with a multifunctional push-pin hole that may also be utilized by the disk drive of FIG. 2.
Figure 4B:
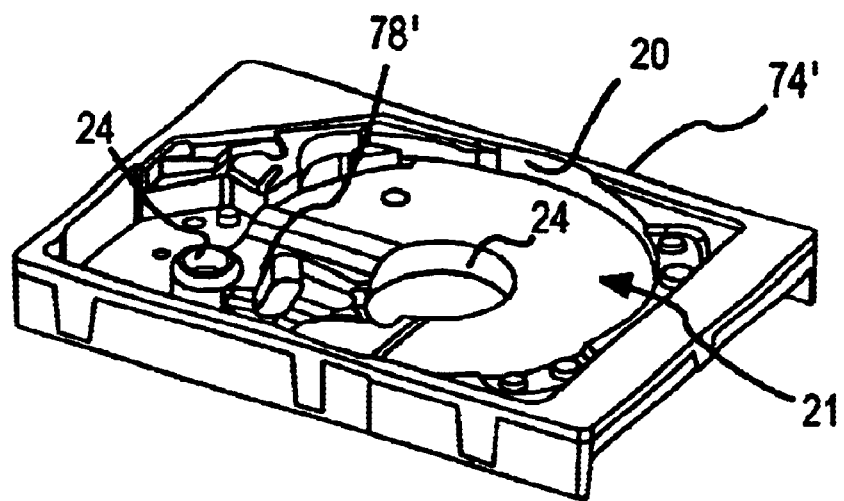
FIG. 4B is a perspective view of the modified base plate of FIG. 4A.
Figure 4C:
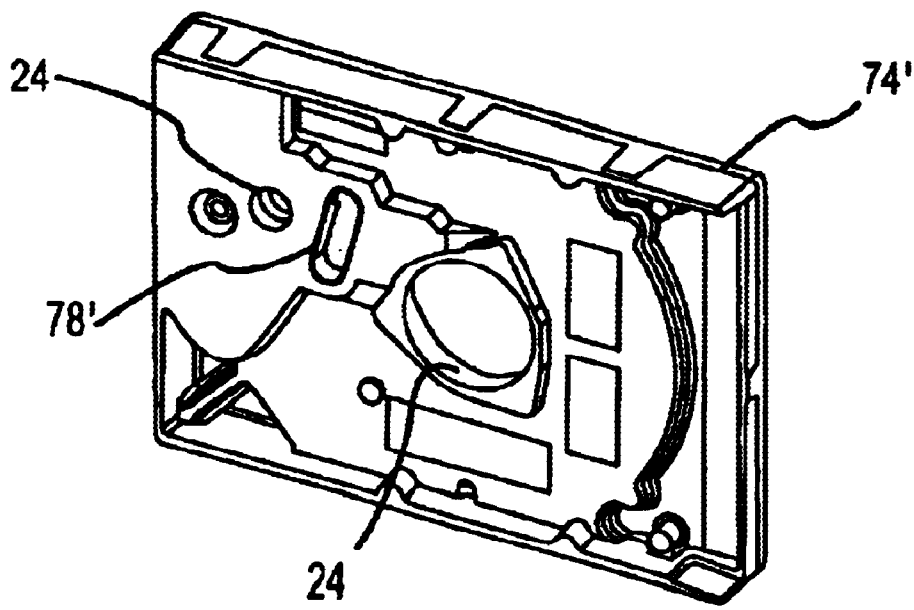
FIG. 4C is a perspective view of the back side of the modified base plate of FIG. 4A.

Another embodiment of a base plate that may be utilized by the disk drive 70 of FIG. 2 and which includes one or more principles of the present invention is illustrated in FIGS. 4A–C in the form of a base plate 74'. The "single prime" designation is used to identify that there are differences between the base plate 74 of FIG. 2 and the base plate 74' of FIGS. 4A–C. The only substantial difference between the embodiments of FIGS. 2 and 4A–C is a change in relative position between a number of the above-noted components. In this regard, FIGS. 4A–C illustrates that the multifunctional push-pin hole 78' and its actuator arm pivot 42 (not shown, but which is disposed in an actuator arm pivot aperture 44) are on the same side of the rotational axis of the data storage disk 18 (not shown) which is defined by the spindle 22 (not shown, but which is disposed in a spindle aperture 24), versus on opposite sides as illustrated in the embodiment of FIG. 2.

FIG. 5A illustrates the prior art push-pin hole 50 from the disk drive 10 of FIG. 1A, while FIGS. 5B–D present variations that may replace the multifunctional push-pin hole 78 of the disk drive 74 of FIG. 2 or in any disk drive configuration for that matter. The profile of the prior art push-pin hole 50 is illustrated by dashed lines in each of FIGS. 5B–D for a reference as to various changes which may be made to the prior art configuration to accommodate the positioning of a filter therein. FIG. 5B illustrates a multifunctional push-pin hole 114 that includes a pair of ends 118 that are spaced apart and interconnected by a pair of sides 122 that are also spaced apart. FIG. 5C illustrates a multifunctional push-pin hole 126 that includes a pair of ends 130 that are spaced apart and interconnected by a pair of sides 134 that are also spaced apart. FIG. 5D illustrates a multifunctional push-pin hole 138 that includes a pair of ends 142 that are spaced apart and interconnected by a pair of sides 146 that are also spaced apart. The sides of each of the multifunctional push-pin holes 114, 126, and 138 are each at least generally accurately-shaped, and project at least generally away from each other.

There are a number of factors which should be considered when sizing/configuring a multifunctional push-pin hole in accordance with principles of the present invention. One consideration is that the size/shape that is employed for a multifunctional push-pin hole should of course allow the ICF 150 to be formed into this shape and to be of an appropriate size to provide its desired function(s). Another is that the structural stiffness of the disk drive base plate should not be adversely affected an undesirable amount. Consider that a dimension "X" is the distance between the corresponding ends of the push-pin hole 50, as well as between the corresponding ends of the multi-functional push-pin holes 78, 114, 126, and 138. Further consider that a dimension "Y" is the maximum distance between the corresponding sides of the push-pin hole 50 and measured perpendicular to the "X" dimension, as well as between the corresponding sides of the multi-functional push-pin holes 78, 114, 126, and 138. So long as the dimension "Y" of any multifunctional push-pin hole in accordance with principles of the present invention is less than the dimension "X" of such a multifunctional push-pin hole, the structural stiffness of the disk drive base plate should not be adversely affected an undesired/unacceptable amount. In one embodiment, the sides of a multifunctional push-pin hole in accordance with principles of the present invention are separated by a distance of at least about 6 mm in the "Y" dimension at least at one location between its ends.

Figure 6:
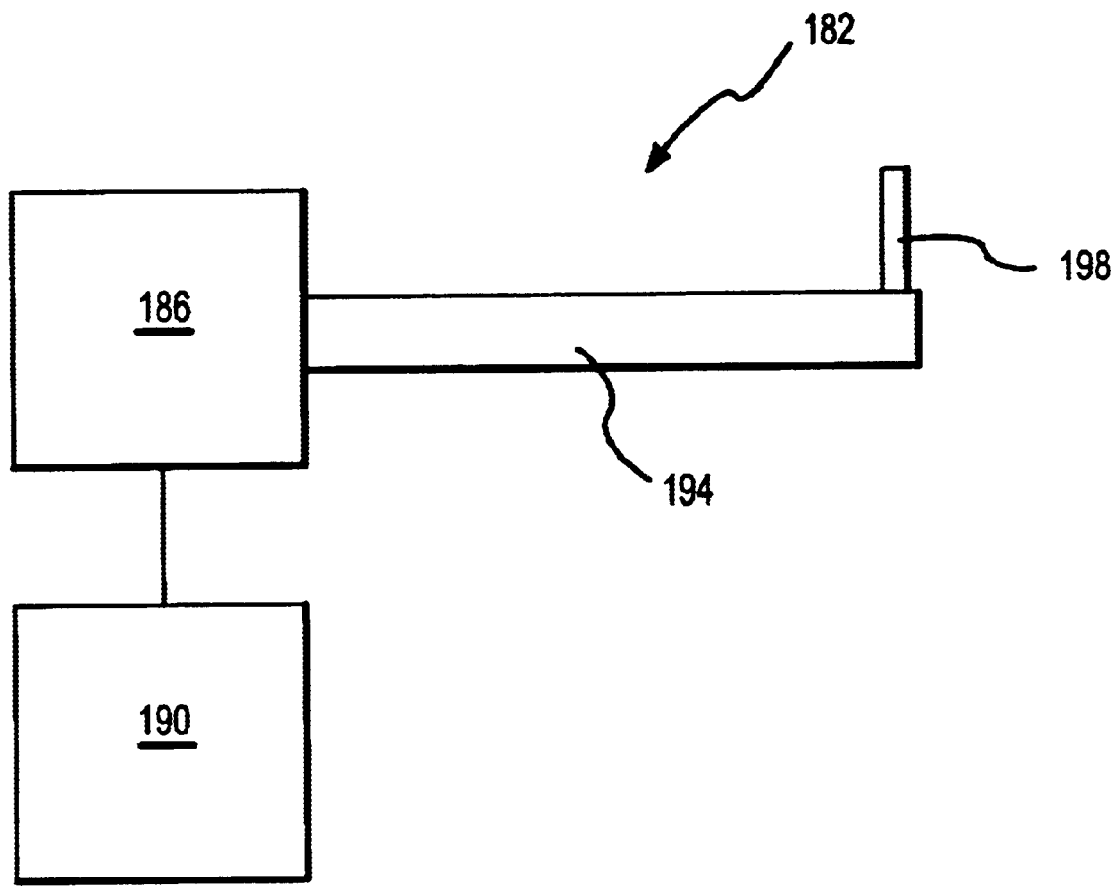
FIG. 6 is a schematic of one embodiment of a servo writer.

The multifunctional push-pin holes disclosed herein do not require any alteration or adaptation of the actual servo writing operation. FIG. 6 presents a schematic of the general characteristics of one embodiment of a servo writer 182. The servo writer 182 generally includes a computer 190 that is operatively interconnected with an appropriate drive 186. An arm 194 is interconnected with this drive 186 and includes a push-pin 198 on end portion thereof. This push-pin 198 is directed through the multifunctional push-pin hole 78 on the back surface of the base plate 74 such that the same is able to engage the actuator arm assembly 30 disposed within the disk drive 70. The arm 194 of the servo writer 182 is moved in a controlled manner by the drive 186 and the computer 190 such that the push-pin 198 moves or follows the actuator arm assembly 30 to a precise radial position on the data storage disk 18. Thereafter, the read/write head 38 exchanges one or more signals with the data storage disk 18 to define the track. This process is repeated for each track to be formed on the data storage disk 18.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A method for assembling a disk drive that comprises a first data storage disk and a push-pin hole, wherein said method comprises the steps of:

executing a servo writing operation on said first data storage disk, wherein said executing step comprises disposing a push-pin through said push-pin hole;

withdrawing said push-pin from said push-pin hole; and disposing a filter in said push-pin hole.

2. A method, as claimed in claim 1, wherein:

said filter comprises means for both filtering gaseous chemicals and addressing moisture content.

3. A method, as claimed in claim 1, wherein:

said first data storage disk comprises a perimeter, wherein a projection of said perimeter onto a base plate of said disk drive defines a first region on said base plate, and wherein said push-pin hole is totally contained within said first region on said base plate.

4. A method, as claimed in claim 1, wherein:

said push-pin hole is disposed directly under said first data storage disk, whereby said-filter is also disposed directly under said first data storage disk.

5. A method, as claimed in claim 1, wherein:

said push-pin hole is elliptically-shaped.

6. A method, as claimed in claim 1, wherein:

said push-pin hole comprises first and second ends, wherein a distance between said first and second ends defines a length dimension of said push-pin hole, wherein a width dimension of said push-pin hole is at least generally transverse to said length dimension, and wherein a magnitude of said width dimension of said push-pin hole increases progressing from each of said first and second ends toward a midpoint between said first and second ends.

7. A method, as claimed in claim 1, wherein:

said push-pin hole comprises first and second longitudinally-spaced ends and first and second laterally-spaced sides, wherein said first and second sides each interconnect said first and second ends, and wherein said first and second sides are disposed in non-parallel relation.

8. A method, as claimed in claim 1, wherein:

said push-pin hole comprises first and second longitudinally-spaced ends and first and second laterally-spaced sides, wherein said first and second sides each interconnect said first and second ends, wherein a distance between said first and second ends defines a length dimension of said push-pin hole, wherein a distance between said first and second sides defines a width dimension of said push-pin hole, wherein said length dimension of said push-pin hole is greater than any said width dimension of said push-pin hole.

9. A method, as claimed in claim 1, wherein:
said push-pin hole comprises first and second longitudinally-spaced ends and first and second laterally-spaced sides, wherein said first and second sides each interconnect said first and second ends, wherein said first and second ends are each at least generally semicircular, and wherein said first and second sides are linear.

10. A method, as claimed in claim 1, wherein:
said filter comprises an integrated chemical filter.

11. A method, as claimed in claim 1, wherein:
said filter comprises a filter material, wherein a minimum amount of said filter material is about 200 milligrams.

12. A method, as claimed in claim 1, wherein:
said filter comprises a filter housing, wherein said filter housing comprises at least one inlet and at least one outlet with a filtering material disposed therebetween which allows for an airflow of at least about 10 cc/minute.

13. A method, as claimed in claim 1, wherein:
said filter comprises means for reducing a sound intensity outside of said disk drive on top of said push-pin hole.

14. A method, as claimed in claim 1, wherein:
a sound intensity outside of said disk drive on top of said push-pin hole, with said filter disposed in said push-pin bole, and during normal disk drive operations is reduced by about 6 decibels in comparison to a not having said filter in said push-pin hole.

15. A method, as claimed in claim 1, wherein:
said filter comprises a housing and charcoal disposed within said housing.

16. A method, as claimed in claim 1, wherein:
said filter comprise a housing which in turn comprises first and second ends, wherein said first end comprises a flange and a first entry port to an interior of said housing, and wherein when said filter is disposed within said push-pin hole, said flange engages an exterior surface of said disk drive and said second end is disposed within an interior of said disk drive, wherein said disk drive further comprises a seal which is disposed over said first end of said housing of said filter and which adheres to said exterior surface of said disk drive, and wherein said seal further comprises a hole which is aligned with said first entry port on said housing of said filter.

17. A method for assembling a disk drive, wherein said disk drive comprises a base plate with a push-pin hole, a first data storage disk, and an actuator arm assembly, wherein said method comprises the steps of:
executing a servo writing operation on said first data storage disk, wherein said executing step comprises disposing a push-pin through said push-pin hole in said base plate, engaging said push-pin against said actuator arm assembly, and moving said push-pin along said push-pin hole to dispose said actuator arm assembly at a predetermined radial position relative to said first data storage disk;
withdrawing said push-pin from said push-pin hole after said executing a servo writing operation step; and
disposing a filter within said push-pin hole after said withdrawing step.

18. A method, as claimed in claim 17, wherein:
said disposing step comprises directing a first end of said filter through said push-pin hole and into an interior space of said disk drive which is defined at least in part by said base plate.

19. A method, as claimed in claim 17, wherein:
said disposing step comprises directing an integrated chemical filter within said push-pin hole.

20. A method, as claimed in claim 17, further comprising the step of:
attaching a cover to said base plate before said executing a servo writing operation step, wherein said cover remains attached to said base plate for said disposing step.

21. A method, as claimed in claim 17, wherein:
said filter comprises first and second ends, said disposing step comprises directing said first end through said push-pin hole and seating said second end against an exterior surface of said base plate, and said method further comprises the step of disposing a sealing tape over said second end of said filter and in engagement with a least a portion of said exterior surface of said base plate.

22. A method for assembling a disk drive that comprises a first data storage disk, a base plate, and a push-pin hole on said base plate, wherein said method comprises the steps of:
executing a servo writing operation on said first data storage disk, wherein said executing step comprises disposing a push-pin through said push-pin hole, wherein said first data storage disk comprises a perimeter, wherein a projection of said perimeter onto said base plate of said disk drive defines a first region on said base plate, and wherein said push-pin hole is totally contained within said first region on said base plate;
withdrawing said plush-pin from said push-pin hole; and
installing a filter in said push-pin hole after said withdrawing step, wherein said filter comprises a filter housing, and wherein said filter housing comprises at least one inlet and at least one outlet with a filtering material disposed therebetween.

23. A method, as claimed in claim 22, wherein:
said push-pin hole is disposed directly under said first data storage disk, whereby said filter is also disposed directly under said first data storage disk after said installing step.

24. A method, as claimed in claim 22, wherein:
said filter comprises an integrated chemical filter.

25. A method, as claimed in claim 22, wherein:
a minimum amount of said filtering material is about 200 milligrams.

26. A method, as claimed in claim 22, wherein:
said filtering material allows for an airflow of at least about 10 cc/minute.

27. A method, as claimed in claim 22, wherein:
said filter comprises means for reducing a sound intensity outside of said disk drive on top of said push-pin hole.

28. A method, as claimed in claim 22, wherein:
said filtering material comprises charcoal disposed within said housing.

29. A method, as claimed in claim 22, wherein:
said filter housing comprises first and second ends, wherein said first end comprises a flange and a first entry port to an interior of said housing, and wherein when said filter is disposed within said push-pin hole, said flange engages an exterior surface of said disk drive base plate and said second end is disposed within an interior of said disk drive, wherein said disk drive further comprises a seal which is disposed over said first end of said filter housing and which adheres to said exterior surface of said base plate, and wherein said seal further comprises a hole which is aligned with said first entry port on said filter housing.

30. A method for assembling a disk drive that comprises a first data storage disk, a base plate, and a push-pin hole on said base plate, wherein said method comprises the steps of:

executing a servo writing operation on said first data storage disk, wherein said executing step comprises disposing a push-pin through said push-pin hole from an exterior side of said base plate;

withdrawing said push-pin from said push-pin hole; and installing a filter in said push-pin hole from said exterior side of said base plate.

31. A method, as claimed in claim 30, wherein:

said installing step comprises allowing for an exchange between an interior of said disk drive and an exterior of said disk drive through said filter.

* * * * *

UNITED STATES PATENT AND TRADEMARK OFFICE
CERTIFICATE OF CORRECTION

PATENT NO. : 6,643,914 B1 Page 1 of 1
DATED : November 11, 2003
INVENTOR(S) : Xu, Yanchu It is certified that error appears in the above-identified patent and that said Letters Patent is hereby corrected as shown below:

Column 5,
Line 45, delete the word "writhin", and insert therefor -- writing --;
Line 45, after the word "operations", insert -- , but --.

Column 8,
Line 33, delete the word "said-filter", and insert therefor -- said filter --.

Column 9,
Line 26, delete the word "bole", and insert therefor -- hole --.

Signed and Sealed this

Sixth Day of January, 2004

JAMES E. ROGAN
*Director of the United States Patent and Trademark Office*